(12) United States Patent
Bissantz

(10) Patent No.: US 11,878,585 B2
(45) Date of Patent: Jan. 23, 2024

(54) TECHNIQUES FOR REPRODUCING PARAMETERS ASSOCIATED WITH VEHICLE OPERATION

(71) Applicant: Nicolas Bissantz, Nuremberg (DE)

(72) Inventor: Nicolas Bissantz, Nuremberg (DE)

( * ) Notice: Subject to any disclaimer, the term of this patent is extended or adjusted under 35 U.S.C. 154(b) by 377 days.

(21) Appl. No.: 16/612,432

(22) PCT Filed: May 11, 2018

(86) PCT No.: PCT/EP2018/062239
§ 371 (c)(1),
(2) Date: Feb. 12, 2020

(87) PCT Pub. No.: WO2018/206780
PCT Pub. Date: Nov. 15, 2018

(65) Prior Publication Data
US 2020/0164748 A1 May 28, 2020

(30) Foreign Application Priority Data
May 12, 2017 (DE) ...................... 10 2017 110 407.0

(51) Int. Cl.
*B60K 35/00* (2006.01)
*G06T 11/00* (2006.01)
*G08G 1/0962* (2006.01)

(52) U.S. Cl.
CPC ............ *B60K 35/00* (2013.01); *G06T 11/001* (2013.01); *G08G 1/09623* (2013.01);
(Continued)

(58) Field of Classification Search
None
See application file for complete search history.

(56) References Cited

U.S. PATENT DOCUMENTS 6,445,809 B1 * 9/2002 Sasaki ................... G06V 20/58
382/104
6,816,268 B1 * 11/2004 Suzuki .................. G06F 40/103
358/1.9

(Continued)

FOREIGN PATENT DOCUMENTS

DE        102010011088 A1    9/2011
EP           2305507 A1     4/2011

OTHER PUBLICATIONS

International Application No. PCT/EP2018/062239, International Search Report and Written Opinion, dated Aug. 30, 2018.

*Primary Examiner* — Jason A Pringle-Parker
(74) *Attorney, Agent, or Firm* — MARSHALL, GERSTEIN & BORUN LLP

(57) ABSTRACT

The invention relates to a vehicle, in particular a motor vehicle, having reproduction means for displaying at least one current parameter of the vehicle, wherein the reproduction means are configured to represent the current parameter value on the reproduction means in the form of numbers or numerical words, wherein there are provided allocation means which are configured to allocate to the number or numerical word, on the basis of the value of the number or numerical word, the size of the number or numerical word and/or at least one parameter of the number or numerical word relating to the color and/or of the background thereof, and wherein the reproduction means are configured to represent the number or numerical word on the reproduction means with the allocated size and/or the color parameter.

16 Claims, 3 Drawing Sheets

Figure 1:
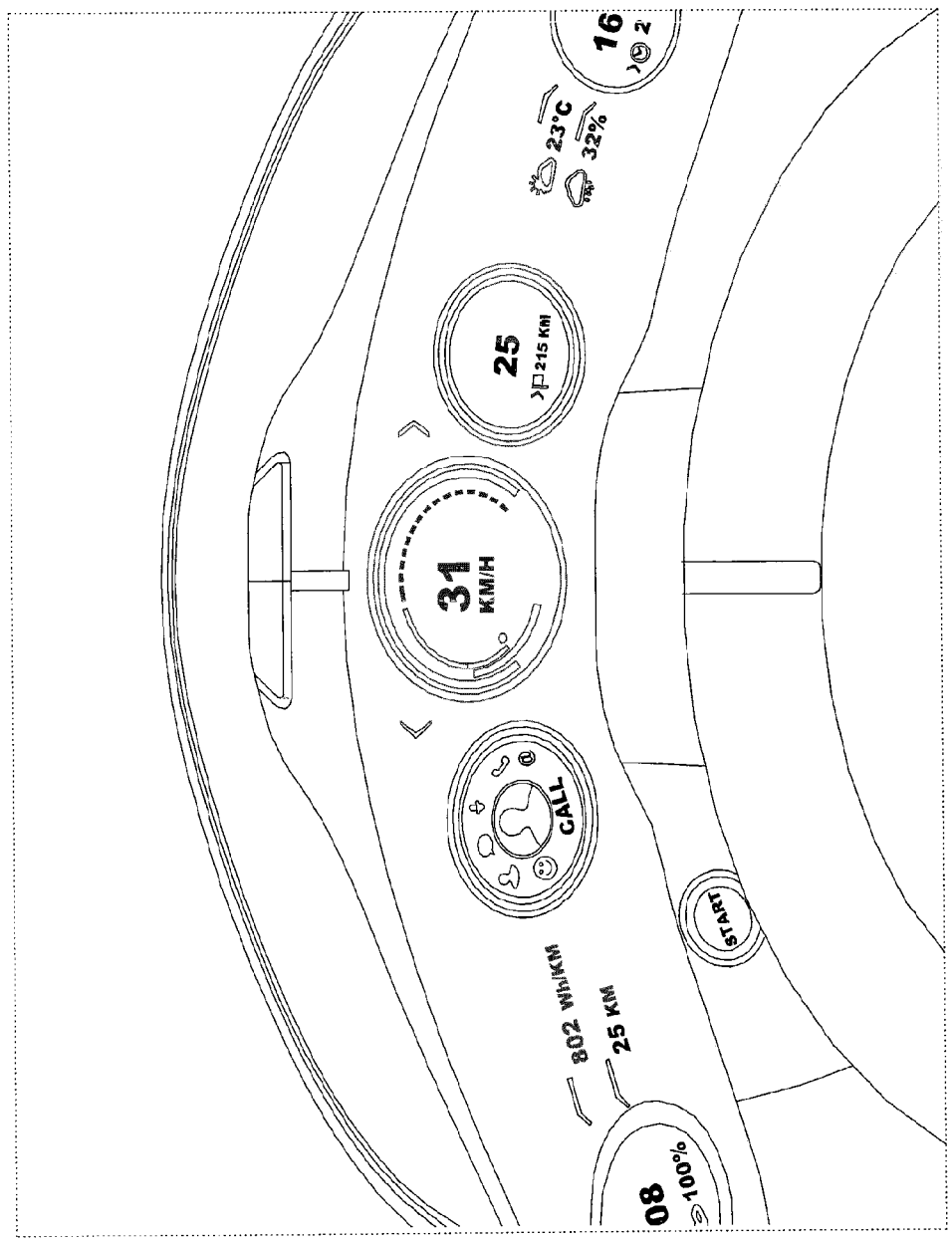

(52) U.S. Cl.
    CPC .. *B60K 2370/152* (2019.05); *B60K 2370/168* (2019.05); *B60K 2370/169* (2019.05); *B60K 2370/171* (2019.05); *B60K 2370/178* (2019.05); *B60K 2370/188* (2019.05); *B60K 2370/193* (2019.05); *B60K 2370/73* (2019.05)

(56) References Cited

U.S. PATENT DOCUMENTS

| | | | |
|---|---|---|---|
| 6,906,634 B1 | 6/2005 | Kuenzner et al. | |
| 8,400,288 B2* | 3/2013 | Bowden | B60K 37/02 116/300 |
| 9,269,169 B2* | 2/2016 | Morimoto | B60K 35/00 |
| 9,463,693 B2* | 10/2016 | Oishi | B60K 35/00 |
| 2005/0065779 A1* | 3/2005 | Odinak | G10L 15/30 704/E15.047 |
| 2005/0232469 A1* | 10/2005 | Schofield | B60R 1/001 382/104 |
| 2007/0001830 A1* | 1/2007 | Dagci | B60K 31/185 340/438 |
| 2008/0309475 A1* | 12/2008 | Kuno | B60K 35/00 340/462 |
| 2012/0083668 A1* | 4/2012 | Pradeep | A61B 5/6803 600/300 |
| 2013/0145360 A1* | 6/2013 | Ricci | H04W 4/48 717/174 |
| 2013/0167013 A1* | 6/2013 | Poliak | G06F 9/451 715/234 |
| 2013/0188259 A1* | 7/2013 | Nakamura | G02B 27/0101 359/630 |
| 2014/0062852 A1* | 3/2014 | Naveh | G06T 11/60 345/156 |
| 2014/0247348 A1* | 9/2014 | Moore, Jr. | G06Q 10/101 701/1 |
| 2015/0109756 A1 | 4/2015 | Choi | |
| 2015/0203036 A1* | 7/2015 | Kajiwara | G06F 3/00 345/7 |
| 2015/0338917 A1* | 11/2015 | Steiner | H04L 9/3271 345/156 |
| 2017/0364148 A1* | 12/2017 | Kim | G06F 3/1454 |
| 2018/0162225 A1* | 6/2018 | Webb | B60K 37/02 |
| 2018/0204454 A1* | 7/2018 | Klabukov | G08G 1/096758 |

* cited by examiner

TECHNIQUES FOR REPRODUCING PARAMETERS ASSOCIATED WITH VEHICLE OPERATION

The invention relates to a vehicle, in particular a motor vehicle, preferably a passenger car, having reproduction means for displaying at least one current parameter, such as, for example, the speed of the vehicle.

Vehicles known from the prior art, which comprise tachometers for displaying the current vehicle speed, have analog and/or digital reproduction means on which the vehicle speed is displayed with numbers or numerical words by means of pointers, dials, displays and/or other display means.

Speed values are thereby frequently displayed as numbers, which can have different relevance for the viewer. For example, maximum permissible speeds or high speeds in general are of particular interest for the viewer, while other speeds may be of secondary importance.

It is a disadvantage in this context that the displayed numbers displaying the current speed are usually reproduced in a uniform format, for example on a dial or display, the format or appearance of the numbers being uniform and independent of the respective numerical values. As a result, it can be difficult for a viewer to quickly and easily pick out or note the numbers which are most relevant for him.

Against this background, the object of the invention is to provide an improved vehicle which allows a driver more easily to quickly pick out the speeds or other parameters that are most relevant for him.

This object is achieved according to the invention by a vehicle having the features of claim 1. Advantageous embodiments are subject-matter of the dependent claims.

There is accordingly provided a vehicle, in particular a motor vehicle and preferably a passenger car, having reproduction means for displaying one or more current parameters of the vehicle, wherein the reproduction means are configured to represent the current parameter value on the reproduction means in the form of numbers or numerical words. There are further provided allocation means which are configured to allocate to the number or numerical word, on the basis of the value of the number or numerical word, the size of the number or numerical word and/or at least one parameter of the number or numerical word relating to the color and/or of the background thereof.

The allocation can take place at least in part such that similar or adjacent speed values or other parameter values are represented with a similar layout.

The reproduction means are further configured according to the invention to represent the number or numerical word on the reproduction means with the allocated size and/or the color parameter.

The size of the number and of the numerical word can in the present case correspond to the font size, which in particular is displayed automatically.

According to the invention there is advantageously achieved an in particular automated representation of numbers or numerical words which corresponds to a current speed or to any other current parameter of the vehicle. Simple and clear recognition or emphasis of particularly relevant speeds/parameter values is thus made possible for a driver of the vehicle.

It is possible to reproduce the number or numerical word in a particularly noticeable manner when particular parameter values, in particular speeds, are reached, such as, for example, when an applicable maximum speed is exceeded. It is also conceivable that the number or numerical word is not only changed in respect of color, size and background, but that it is reproduced in a flashing manner in order to increase the visibility of the number or numerical word.

In the allocation of the color parameters and/or of the size to the reproduced number or to the reproduced numerical word, the value or amount of the current parameter value can in particular be taken into consideration, the size of the number or numerical word increasing with the size of the parameter value. The relationship can be directly proportional, but other dependencies are also conceivable and covered by the invention.

In a preferred embodiment it is conceivable that detection means are provided which are configured to detect at least one state parameter of the vehicle, wherein the allocation means are adapted to allocate the size and/or the color parameter on the basis of the state parameter.

The expression "color parameter" is to be understood as meaning any desired property of a color, such as the type of color (red, blue, green, etc.), the color depth, the brightness, the contrast, etc.

If more than one state parameter is detected, the number or numerical word can correspondingly be varied in respect of the color shade and the size on the basis of more than one state parameter.

The detection means can comprise, for example, optical sensors and/or other sensor devices, by means of which the allocation means can be provided with state parameters of the vehicle or state parameters relating to the vehicle and/or its surroundings.

In a further preferred embodiment it is conceivable that the state parameter is the ambient brightness of the vehicle. Depending on the brightness determined in the region of the vehicle, the size and/or the brightness of the number or numerical word can thus be increased or reduced.

If, for example, it is determined that it is relatively dark in the vicinity of the vehicle, for example because the vehicle is travelling through a tunnel or at night, the allocation means can allocate correspondingly darker colors to the number or numerical word so as not to dazzle the driver with light that is too bright.

In a further preferred embodiment it is conceivable that the state parameter is related to the weather conditions. The detection means can thereby be adapted, for example, to detect the outside temperature and/or the wind conditions and/or precipitations and/or the visibility in order, for example, in dependence thereon, to display the number or numerical word, for example, in a warning color shade if a particular speed is exceeded.

That particular speed can be, for example, a maximum permissible speed or another limit which is determined, for example, by the tires.

It is pointed out at this juncture that the present invention is not limited to the vehicle speed as the parameter. Alternatively or in addition, other parameters, such as, for example, the state of charge of the battery or of an accumulator, temperature, tire pressure, etc., are also conceivable as parameters and are covered by the invention.

In a further preferred embodiment it is thus conceivable that the state parameter relates to the equipment with which the vehicle is fitted, such as in particular the type of vehicle tires. If, for example, the detection means determine that the vehicle is fitted with winter tires, the size and/or the color parameter can be allocated correspondingly differently when the maximum speed applying to winter tires is exceeded.

The equipment with which the vehicle is fitted that is so detected can alternatively or additionally be a vehicle trailer, a roof rack and/or a bicycle rack, the presence of which on the vehicle can be determined by means of the detection means.

If such components are detected on the vehicle, the allocation means can allocate to the number or numerical word correspondingly changed color parameters and/or sizes, while at the same time taking the current speed into consideration.

In general, the detection means can also comprise means for manually entering parameters, which the driver can accordingly enter by hand. Limit speeds or other limit values which may have to be taken into consideration can hereby also be entered manually and, for example, according to the driver's wishes.

In a further preferred embodiment it is conceivable that the state parameter relates to speed limits that apply and/or traffic signs that are located in the region of the vehicle.

For this purpose, the detection means can be in the form of, for example, a camera which faces in particular in the direction of travel of the vehicle and by means of which speed limits which can be displayed on traffic signs can be detected.

Alternatively or in addition, the detection means can comprise a communication device and/or a navigation device by means of which information about speed limits can be transmitted to the vehicle and in particular to the allocation means.

In a further preferred embodiment it is conceivable that the state parameter relates to road users that are present in the region of the vehicle. For this purpose, a sensor device can be provided, by means of which the presence and/or the distance and/or the speed of other road users can be detected and transmitted to the allocation means.

If it is thereby determined that other road users are at too small a distance from the vehicle, the allocation means can allocate the color parameter and/or the size of the number or numerical word correspondingly differently. For example, if the distances between the road users are too small, the current speed can be displayed in a warning color shade and/or in a flashing manner, in order thereby to prompt an increase in the safe distance.

The comments made above and below apply correspondingly to parameters other than the speed.

In a further preferred embodiment it is conceivable that the state parameter is the time for which the vehicle has been travelling. If the detection means determine, for example, that the vehicle has been moving for a prolonged period of time without suitable breaks, a corresponding adjustment of the speed of travel can be suggested, if a specific limit speed is exceeded, by changing or allocating corresponding color parameters and/or sizes of the numbers or numerical words.

In a further preferred embodiment it is conceivable that the state parameter is the direction in which the driver of the vehicle is looking. If the detection means determine that the driver is not paying attention or not paying sufficient attention to the displayed speed, the display can be modified analogously to the manner described above, in particular in cases where the current speed is above an applicable limit value.

In a further preferred embodiment it is conceivable that the state parameter is the state of charge of a battery of the vehicle. In particular in the case of an electric vehicle, it can be communicated to the driver, by correspondingly displaying a lower or decreasing maximum speed as the vehicle batteries drain, that more economical, slower driving has a positive effect on the range of his vehicle.

The reproduction means are preferably configured to choose the size and/or the color depth of the number or numerical word to be larger or smaller according to how large the value of the number or numerical value is. If the parameter is, for example, the distance from a vehicle in front, the size of the number which reproduces the distance can be so chosen that the larger the distance, the smaller the number. If the parameter is the vehicle speed, the size of the number which reproduces the speed can be so chosen that the greater the vehicle speed, the larger the number.

It is further conceivable that the reproduction means are configured to change the size and/or at least one color parameter of the number or numerical word when the speed of the vehicle or another parameter reaches or exceeds a limit value.

The present invention relates further to a method for reproducing at least one current parameter, preferably the current speed, of a vehicle according to the characterizing part of any one of the preceding claims. According to the invention, all the features described in relation to the vehicle are also part of the claimed method.

Figure 2:
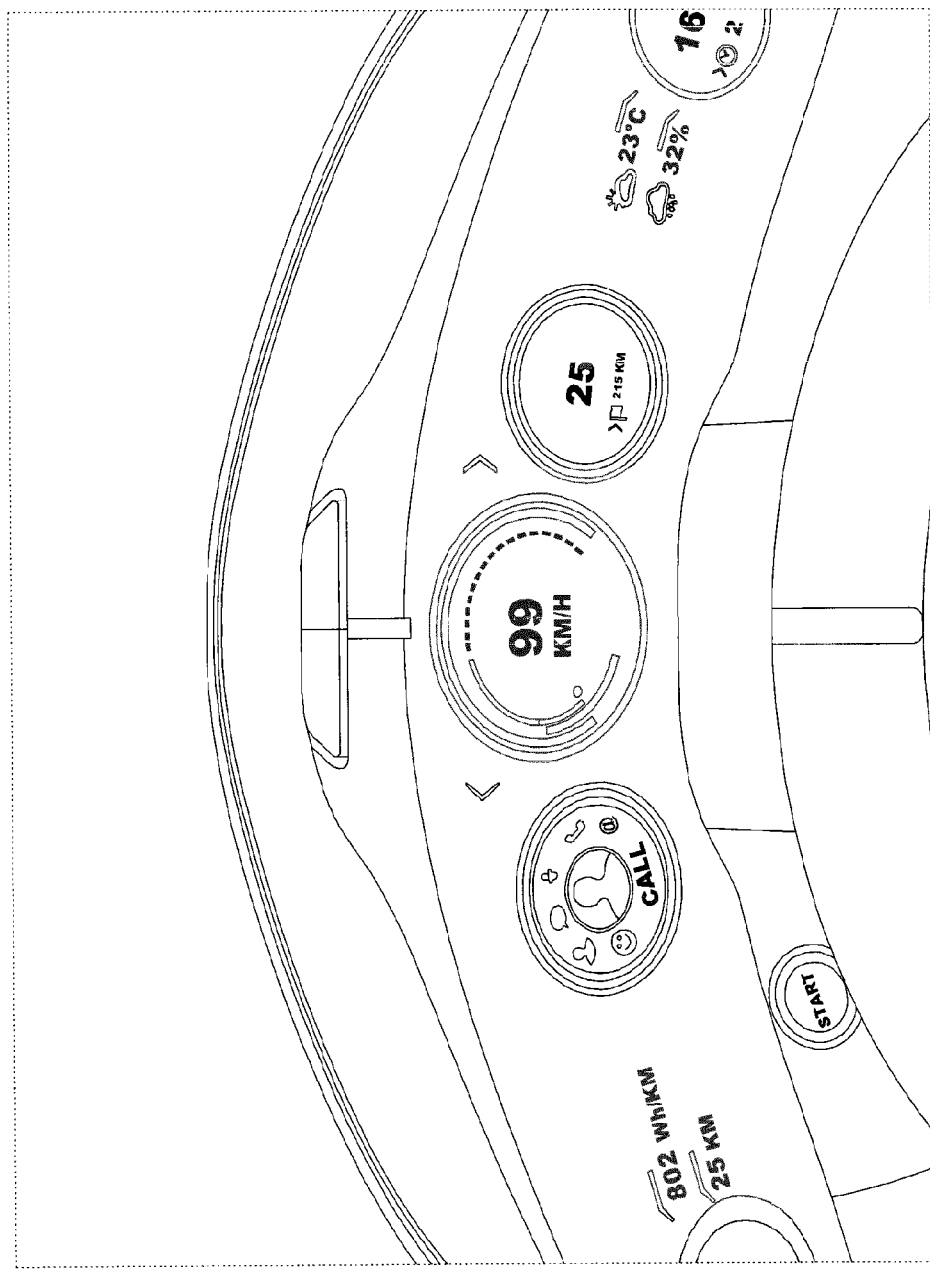
Figure 3:
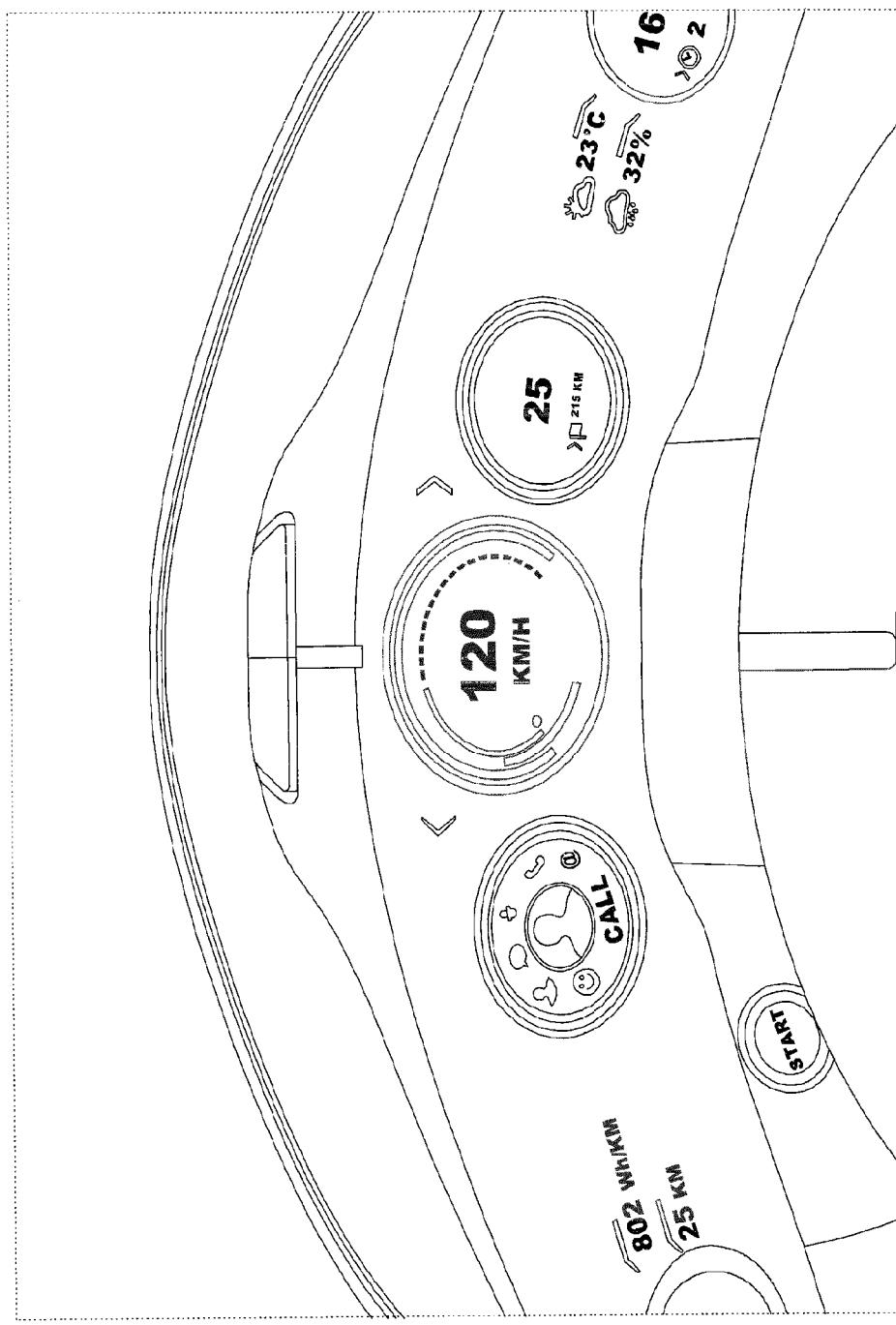

Further details and advantages are explained by means of the embodiment shown by way of example in the figures, in which:

FIG. 1: shows part of a dashboard region of a vehicle according to the invention in a first speed range;

FIG. 2: shows part of a dashboard region of a vehicle according to the invention in a limit region of the first speed range; and FIG. 3: shows part of a dashboard region of a vehicle according to the invention in a second speed range.

FIGS. 1 to 3 show part of a dashboard region of a vehicle according to the invention at different speeds. The reproduction means are in the form of a digital display, which can be part of a touchscreen. The reproduction means, or the tachometer, are to be seen in the middle of each of the figures.

FIGS. 1 and 2 show the vehicle at speeds below an exemplary limit speed of 100 km/h, the lower speed shown in FIG. 1 being displayed in a lighter blue and smaller than the higher speed which is shown in FIG. 2.

When the exemplary limit speed is exceeded, the current, too high speed is displayed in a different color shade, a different grey stage and/or in a different, in particular larger, size, as is indicated in FIG. 3. This change in the display can be sudden, that is to say can occur when a limit value is exceeded, etc.

Alternatively or in addition, it is conceivable that the color of the background of the number or numerical word is displayed in a different color shade. The color shade of the background can also vary in dependence on the value of the number that is being represented.

The speed at which a color change is initiated can be, for example, a maximum speed which is detected by detection means and applies in the region of the vehicle.

In the case of other, less relevant changes in speed, on the other hand, the color can be retained and only the color shade and/or the color intensity and/or the brightness of the color can be changed, in particular continuously and/or according to the change in the speed of the vehicle.

Any of the state parameters mentioned above can be used for the allocation of the color and/or size of the number and also, for example, for a possible flashing representation of the number or numerical word.

The detection means can comprise any components already present on the vehicle, such as, for example, a distance sensor or a brightness sensor.

The invention claimed is:

1. A system for displaying representations of parameters associated with operation of a vehicle, comprising:
   at least one sensor configured to detect (i) a current value of a parameter associated with operation of the vehicle, and (ii) more than one state parameter of the vehicle or of a set of surroundings of the vehicle;
   allocating, based on the current value of the parameter, a size for a number representation of the current value of the parameter, wherein the size for the number representation increases as the current value of the parameter increases, wherein the size for the number representation is directly proportional to a size of the current value, and wherein a color parameter for the number representation is allocated based on the more than one state parameter; and
   a digital display configured to display the number representation of the current value of the parameter in the size that was determined,
   and wherein a state parameter of the more than one state parameter is a direction in which a driver of the vehicle is looking.

2. The system according to claim 1, wherein the digital display is a display device of a tachometer, and wherein the parameter is a speed of the vehicle.

3. The system according to claim 1, wherein one of the more than one state parameter is an ambient brightness of the vehicle.

4. The system according to claim 1, wherein one of the more than one state parameter is related to weather conditions to which the vehicle is exposed.

5. The system according to claim 1, wherein one of the more than one state parameter relates to equipment with which the vehicle is fitted.

6. The system according to claim 5, wherein one of the more than one state parameter relates to a type of vehicle tires.

7. The system according to claim 1, wherein one of the more than one state parameter relates to speed limits that apply and/or traffic signs that are located in a region of the vehicle.

8. The system according to claim 1, wherein one of the more than one state parameter relates to road users that are present in a region of the vehicle.

9. The system according to claim 1, wherein one of the more than one state parameter is a time for which the vehicle has been travelling.

10. The system according to claim 1, wherein one of the more than one state parameter is a state of charge of a battery of the vehicle.

11. The system according to claim 1, wherein a color depth for the number representation of the current value of the parameter is determined based on the current value of the parameter.

12. The system according to claim 1, wherein the digital display is further configured to change the size for the number representation when the current value of the parameter reaches or exceeds a limit value.

13. The system according to claim 1, wherein the vehicle is a motor vehicle.

14. The system according to claim 1, wherein a background for the number representation of the current value of the parameter is determined based on the current value of the parameter.

15. The system according to claim 14, wherein the digital display is configured to display the number representation of the current value of the parameter in the size and in at least one of the color or the background that was determined.

16. A computer-implemented method of displaying representations of parameters associated with operation of a vehicle, the method comprising:
   detecting, by at least one sensor of the vehicle, (i) a current value of a parameter associated with operation of the vehicle, and (ii) more than one state parameter of the vehicle or of a set of surroundings of the vehicle;
   determining, based on the current value of the parameter, a size for a number representation of the current value of the parameter, wherein the size for the number representation increases as the current value of the parameter increases, wherein the size for the number representation is directly proportional to a size of the current value, and wherein a color parameter for the number representation is determined based on the more than one state parameter; and
   displaying, in a digital display, the number representation of the current value of the parameter in the size that was determined,
   and wherein a state parameter of the more than one state parameter is a direction in which a driver of the vehicle is looking.

* * * * *